K. KLEINERT.
PROJECTION LAMP.
APPLICATION FILED MAY 22, 1915.
1,232,046.
Patented July 3, 1917.
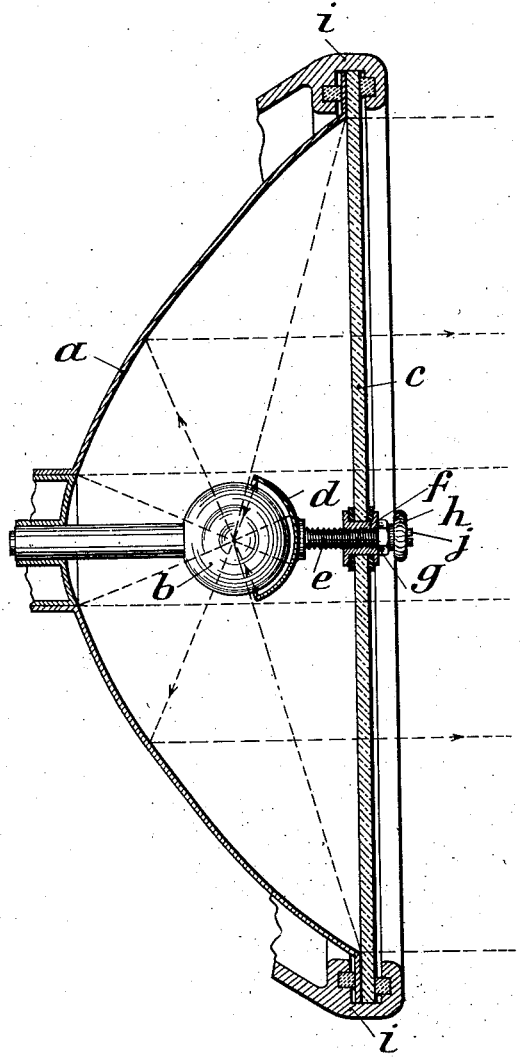
INVENTOR
Karl Kleinert
BY
ATTORNEYS

UNITED STATES PATENT OFFICE.

KARL KLEINERT, OF STUTTGART, GERMANY, ASSIGNOR TO THE FIRM OF ROBERT BOSCH, OF STUTTGART, GERMANY.

PROJECTION-LAMP.

1,232,046.   Specification of Letters Patent.   Patented July 3, 1917.

Application filed May 22, 1915. Serial No. 29,785.

*To all whom it may concern:*

Be it known that I, KARL KLEINERT, a subject of the Emperor of Austria, residing at 57 Traubenstrasse, Stuttgart, Germany, have invented certain new and useful Improvements in Projection-Lamps; and I do hereby declare the following to be a full, clear, and exact description of the invention, such as will enable others skilled in the art to which it appertains to make and use the same.

Projection lamps having a rearwardly-directed supplementary reflector disposed in front of the source of light for reflecting back to the main reflector those rays which would otherwise be projected in undesirable directions divergent to the axis of projection, have heretofore been used, but the arms or brackets for supporting the supplementary reflector are disposed in the field of projection of the light and they cause shadows or otherwise interfere with the effectiveness of the lamp. The object of the present invention is to provide supporting means for the supplementary reflector wholly disposed out of the field of projection, and also to provide adjusting means therefor likewise wholly disposed out of the field of projection and accessible from the outside of the lamp for adjusting the position of the supplementary reflector relatively to the source of light. In the preferred embodiment, I do this by means of an axially-disposed threaded rod fastened to the rear of the supplementary reflector and passing through a nut held by the transparent cover which is fastened over the main reflector of the projection lamp, the rod having an outwardly disposed part suitable for effecting axial movements, and a lock nut thereon for locking the rod and supplementary reflector in adjusted axial position.

The accompanying drawing illustrates in central section this preferred embodiment in application to an electric headlight for moving vehicles, as an example, in which an axially-directed cylindrical beam is desired. The main reflector $a$ is of parabolic form, and the incandescent lamp $b$ is supported from the main reflector with its light-giving filament positioned substantially at the focus thereof. The glass cover $c$ is fastened over the front of the main reflector by a retaining rim carried on the lamp housing $i$, and it is provided with a nut $f$. The supplementary reflector $d$ is of spherical contour and partly encompasses the front of the incandescent lamp, its concave surface being mirrored to reflect back to the main reflector all of the rays which would otherwise be projected from the headlight in undesirable directions divergent to the axis of projection, as shown by the broken lines in the drawing. The threaded rod $e$ is attached to the rear of the supplementary reflector $d$ and passes through the nut $f$. It has a slotted head $j$ in front of the cover for adjusting the position of the supplementary reflector relatively to the incandescent lamp $b$, the lock nuts $g$ and $h$ being provided to lock the parts in adjusted position.

It will be observed that the supporting rod $e$ is axially disposed and that it is wholly disposed out of the field of projection of the headlight. Furthermore, the adjusting means for the supporting rod $e$ are likewise wholly disposed out of the field of projection and are accessible from the outside of the headlight. In this way, the supporting and adjusting means for the supplementary reflector do not cast shadows or otherwise interfere with the effectiveness of the headlight, and furthermore the supplementary reflector may be adjusted in desired position without exposing the highly polished surface of the reflectors.

Having thus described my invention, what I claim is:

1. In a projection lamp, a main reflector of parabolic form, a source of light positioned in front of the main reflector, a rearwardly-directed supplementary reflector in front of the source of light, a transparent lamp cover through which the light is projected from the main reflector, and supporting means disposed wholly out of the field of projection and connecting the supplementary reflector to the cover, one of the connections of the supporting means being effective to adjust the position of the supplementary reflector relatively to the source of light.

2. In a projection lamp, a main reflector of parabolic form, a source of light positioned in front of the main reflector, a rearwardly-directed supplementary reflector in front of the source of light, a transparent lamp cover through which the light is projected from the main reflector, and supporting means disposed along the axis of projection wholly out of the field thereof and supporting the supplementary reflector from the cover, said supporting means being adjustable axially to adjust the position of the supplementary reflector relatively to the source of light.

3. In a projection lamp, a main reflector of parabolic form, a source of light positioned in front of the main reflector, a rearwardly-directed supplementary reflector in front of the source of light, a transparent lamp cover through which the light is projected from the main reflector, supporting means disposed wholly out of the field of projection and supporting the supplementary reflector from the cover, and adjusting means also disposed wholly out of the field of projection and being accessible from the outside of the cover for adjusting the position of the supplementary reflector relatively to the source of light.

4. In a projection lamp, a main reflector of parabolic form, an incandescent lamp, a rearwardly-directed supplementary reflector in front of the lamp, a transparent lamp cover through which the light is projected from the main reflector, and axially-adjustable supporting means disposed along the axis of projection wholly out of the field thereof and being fastened to the supplementary reflector, said supporting means having an adjustable connection with the cover accessible from the outside thereof for supporting the supplementary reflector therefrom in axially-adjusted position relatively to the lamp.

In testimony whereof I affix my signature, in presence of two witnesses.

KARL KLEINERT.

Witnesses:
PAUL WOLFART,
ADOLF LEBHERT.